(12) United States Patent
Omori

(10) Patent No.: US 11,270,421 B2
(45) Date of Patent: Mar. 8, 2022

(54) IMAGE PROCESSING APPARATUS AND IMAGE PROCESSING METHOD THAT REDUCE IMAGE NOISE, AND STORAGE MEDIUM

(71) Applicant: CANON KABUSHIKI KAISHA, Tokyo (JP)

(72) Inventor: Hirotaka Omori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 16/673,211

(22) Filed: Nov. 4, 2019

(65) Prior Publication Data
US 2020/0143527 A1    May 7, 2020

(30) Foreign Application Priority Data

Nov. 6, 2018    (JP) .............................. JP2018-209194

(51) Int. Cl.
G06T 5/50    (2006.01)
G06T 5/00    (2006.01)
H04N 5/235   (2006.01)

(52) U.S. Cl.
CPC ................ G06T 5/50 (2013.01); G06T 5/002 (2013.01); H04N 5/2355 (2013.01);
(Continued)

(58) Field of Classification Search
CPC . G06T 5/50; G06T 5/002; G06T 2207/10016; G06T 2207/10048;
(Continued)

(56) References Cited

U.S. PATENT DOCUMENTS

2013/0051700 A1\*  2/2013  Jo ........................... G06T 5/003
                                                    382/284
2014/0152861 A1\*  6/2014  Tsuzuki ............... H04N 5/3355
                                                    348/222.1
(Continued)

FOREIGN PATENT DOCUMENTS

JP    2000-224444 A    8/2000
JP    2012-231273 A    11/2012
(Continued)

OTHER PUBLICATIONS

The above patent documents were cited in a Partial European Search Report dated Feb. 24, 2020, which is enclosed, that issued in the corresponding European Patent Application No. 19203870.1.
(Continued)

*Primary Examiner* — Phuoc Tran
(74) *Attorney, Agent, or Firm* — Cowan, Liebowitz & Latman, P.C.

(57) ABSTRACT

An image processing apparatus comprises: at least one processor or circuit configured to perform the operations of following units: an obtaining unit configured to obtain a plurality of image signals being composed of image signals shot wider different shooting conditions; a determination unit configured to determine a composition rate in order to composite an image signal that has the predetermined shooting condition with a noise-reduced image that has the predetermined shooting condition, in accordance with an inter-frame change amount and a parameter indicating the predetermined shooting condition; a noise reduction unit configured to composite the image signal with the noise-reduced image using the composition rate to generate a new noise-reduced image; and a composition unit configured to composite the new noise-reduced image and an image signal that has another shooting condition.

13 Claims, 14 Drawing Sheets

(52) U.S. Cl.
CPC .............. *G06T 2207/10016* (2013.01); *G06T 2207/10048* (2013.01); *G06T 2207/10144* (2013.01); *G06T 2207/20201* (2013.01); *G06T 2207/20221* (2013.01); *G06T 2207/30232* (2013.01)

(58) Field of Classification Search
CPC . G06T 2207/10144; G06T 2207/20201; G06T 2207/20221; G06T 2207/30232; G06T 2207/20182; H04N 5/2355; H04N 5/35572; H04N 5/357; H04N 5/2356; H04N 5/23254; H04N 5/21
See application file for complete search history.

(56) References Cited

U.S. PATENT DOCUMENTS

| | | |
|---|---|---|
| 2014/0160298 A1 | 6/2014 | Johnson |
| 2017/0163853 A1 | 6/2017 | Hata |
| 2020/0204722 A1* | 6/2020 | Saito .................... H04N 5/2351 |
| 2020/0396369 A1* | 12/2020 | Fujiwara ................ H04N 5/232 |

FOREIGN PATENT DOCUMENTS

| | | |
|---|---|---|
| JP | 2013-255144 A | 12/2013 |
| JP | 6045894 B2 | 12/2016 |

OTHER PUBLICATIONS

The above patent documents were cited in a European Search Report dated Jul. 9, 2020, which is enclosed, that issued in the corresponding European Patent Application No. 19203870.1.

* cited by examiner

SHORT EXPOSURE IMAGE

LONG-SECOND EXPOSURE IMAGE

WDR COMPOSITE IMAGE

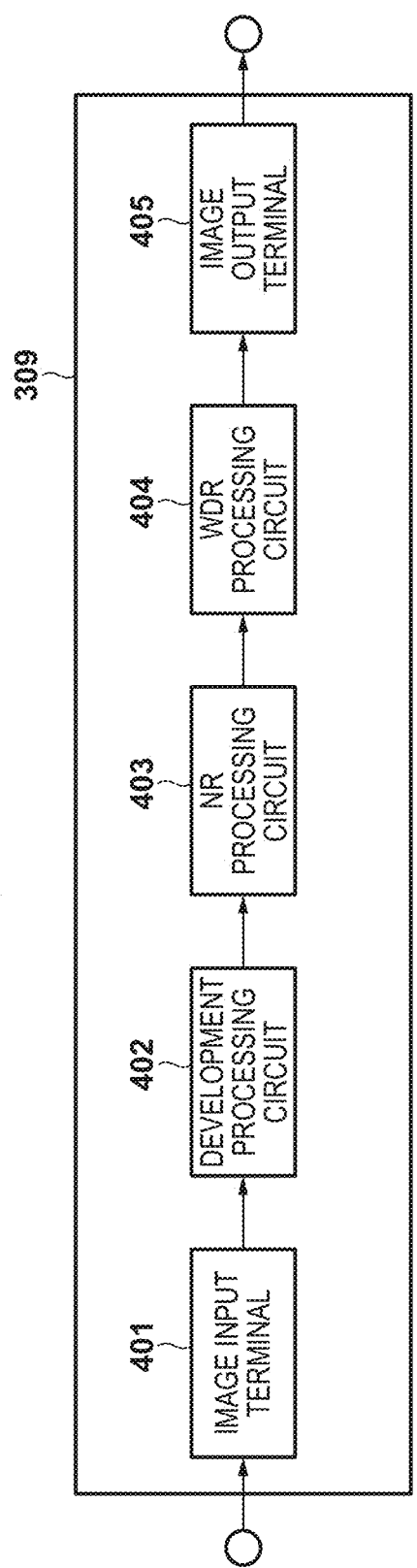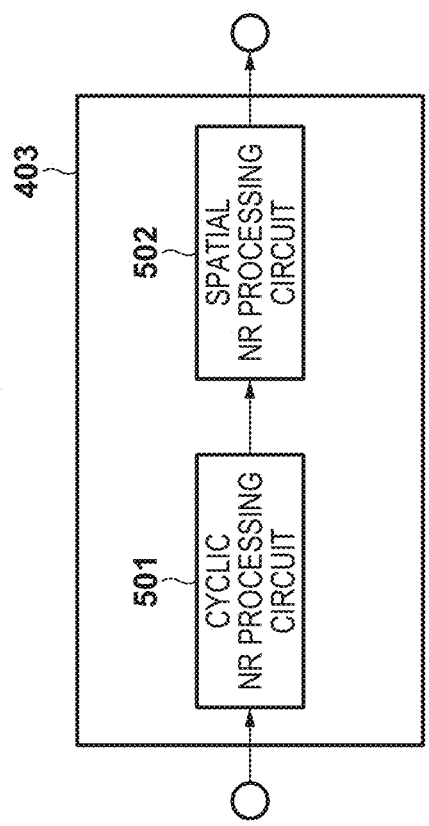

FIG. 11A
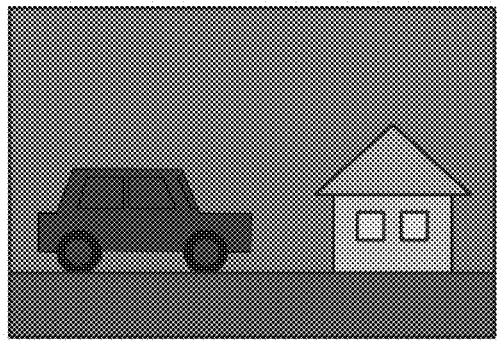
SHORT EXPOSURE IMAGE
AFTER CYCLIC NR PROCESSING
FIG. 11B
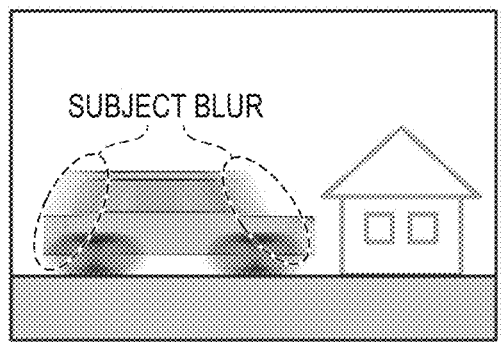 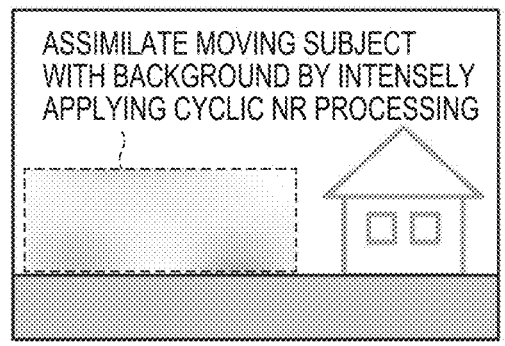
LONG EXPOSURE IMAGE BEFORE/AFTER CYCLIC NR PROCESSING
FIG. 11C
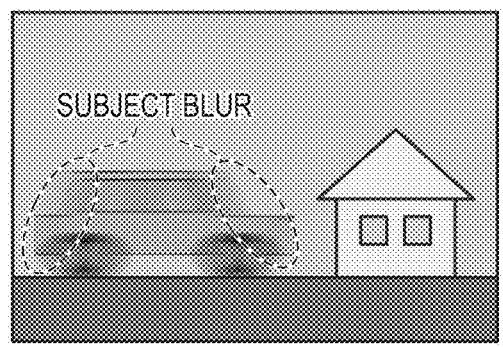 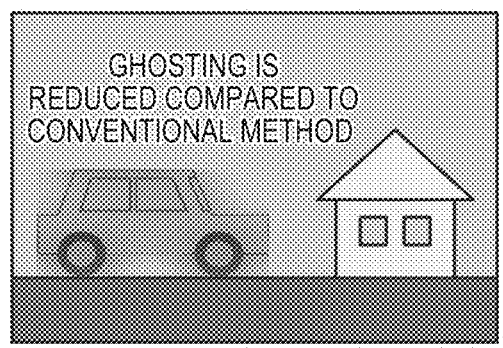
WDR COMPOSITE IMAGE OF CONVENTIONAL METHOD (LEFT)
AND PROPOSED METHOD (RIGHT)

IMAGE PROCESSING APPARATUS AND IMAGE PROCESSING METHOD THAT REDUCE IMAGE NOISE, AND STORAGE MEDIUM

BACKGROUND OF THE INVENTION

Field of the Invention

The present invention relates to an image processing apparatus and an image processing method that reduce image noise, and a storage medium.

Description of the Related Art

Conventionally, cyclic noise reduction processing is known that can reduce random noise generated in the time direction by compositing two frames that are consecutive in the time direction of moving image signals (an input signal of a current frame and an output signal of an immediately preceding frame). In the cyclic noise reduction processing, a rate at which frames are composited (hereinafter referred to as a cyclic coefficient) can be set in accordance with a result of calculating an amount of change between two frames, as suggested by Japanese Patent Laid-Open No. 2000-224444. By setting a cyclic coefficient in accordance with a resultant inter-frame change amount, noise reduction processing that distinguishes between a still subject and a moving subject can be performed.

Meanwhile, a technique is known that composites a plurality of images obtained by shooting a subject under different conditions, for example, in a case where wide dynamic range processing (hereinafter referred to as WDR processing) is performed, and in processing for compositing images of different wavelength ranges. In the WDR processing, an input signal with a short exposure period (hereinafter referred to as a short exposure image) and an input signal with a long exposure period (hereinafter referred to as a long exposure image) are shot as one pair, and these input images are composited selectively on a per-pixel basis. Such processing makes it possible to generate an output signal that presents a wide dynamic range (hereinafter referred to as a WDR composite image).

Furthermore, as processing for compositing images of different wavelength ranges, a technique to composite a visible light signal and an infrared light signal is known, as suggested by Japanese Patent Laid-Open No. 2013-255144. In this technique, an infrared image is composited with or superimposed on a visible image in a dark environment, such as night time, and in an environment with poor visibility due to fog, haze, and the like in the case of a visible light image; this makes it possible to obtain a composite image in which a background image was shot in color and a target subject was shot vividly in monochrome.

In a case where processing for compositing a short exposure image and a long exposure image or processing for compositing images of different wavelength ranges is included, the existence of a moving subject at the time of shooting could possibly cause the occurrence of ghosting around the moving subject, or generate a composite image that has different luminance values and noise amounts depending on the position. Especially, as a moving subject in a long exposure image is susceptible to subject blur, it can cause the occurrence of ghosting throughout a wide range in an image after WDR composition processing.

For example, when a moving subject that shifts from left to right exists in FIGS. 1A to 1C, subject blur occurs throughout a wide range in a long exposure image of FIG. 1B compared to a short exposure image of FIG. 1A. If the aforementioned standard WDR composition processing is applied in this state, as shown in FIG. 1C, the moving subject after the composition processing is influenced by subject blur that has occurred in the long exposure image, and ghosting occurs throughout a wide range, thereby lowering visibility.

To address this problem, Japanese Patent Laid-Open No. 2012-231273 suggests a method that determines whether each pixel is a moving subject region, and determines a composition rate based on the determination result. Specifically, a composition rate of a short exposure image is set to be high with respect to a pixel that has been determined to be a moving subject, and a composition rate of a long exposure image is set to be high with respect to a pixel that has been determined to be motionless.

However, the technique disclosed in Japanese Patent Laid-Open No. 2012-231273 is based on the premise that a region of a moving subject can be accurately extracted. This has problems in that a calculation cost is required in determining a moving subject between two images with different exposure periods, the circuit scale is large, the precision is lowered due to the influence of noise, and so on. That is to say, there is demand for a technique that can generate a composite image in which, even if a moving subject exists, an unpleasant impression caused by motion is reduced when generating the composite image using shot moving images.

SUMMARY OF THE INVENTION

The present disclosure has been made in consideration of the aforementioned issues, and realizes a technique that can generate a composite image in which, even if a moving subject exists, an unpleasant impression caused by motion has been reduced when generating the composite image using shot moving images.

In order to solve the aforementioned problems, one aspect of the present disclosure provides an image processing apparatus comprising: at least one processor or circuit configured to perform the operations of following units: an obtaining unit configured to sequentially obtain a plurality of image signals included in moving image data, the plurality of image signals being composed of image signals shot under different shooting conditions; a determination unit configured to determine a composition rate in order to composite an image signal that is included among the plurality of image signals and has a predetermined shooting condition included among the different shooting conditions with a noise-reduced image that has the predetermined shooting condition and has already been generated; a noise reduction unit configured to composite the image signal that has the predetermined shooting condition with the noise-reduced image that has the predetermined shooting condition and has already been generated using the composition rate, thereby generating a new noise-reduced image that has the predetermined shooting condition; and a composition unit configured to composite the new noise-reduced image that has been generated with respect to the predetermined shooting condition and an image signal that has another shooting condition, wherein the determination unit determines the composition rate in accordance with an inter-frame change amount of the image signal that has the predetermined shooting condition and a parameter indicating the predetermined shooting condition.

Another aspect of the present disclosure provides, an image processing method comprising: sequentially obtaining a plurality of image signals included in moving image data, wherein the plurality of image signals are composed of image signals shot under different shooting conditions; determining a composition rate in order to composite an image signal that is included among the plurality of image signals and has a predetermined shooting condition included among the different shooting conditions with a noise-reduced image that has the predetermined shooting condition and has already been generated; compositing the image signal that has the predetermined shooting condition with the noise-reduced image that has the predetermined shooting condition and has already been generated using the composition rate, thereby generating a new noise-reduced image that has the predetermined shooting condition; and compositing the new noise-reduced image that has been generated with respect to the predetermined shooting condition and an image signal that has another shooting condition, wherein the determining determines the composition rate in accordance with an inter-frame change amount of the image signal that has the predetermined shooting condition and a parameter indicating the predetermined shooting condition.

Still another aspect of the present disclosure provides, a non-transitory computer-readable storage medium storing a program for causing a computer to execute an image processing method comprising: sequentially obtaining a plurality of image signals included in moving image data, wherein the plurality of image signals are composed of image signals shot under different shooting conditions; determining a composition rate in order to composite an image signal that is included among the plurality of image signals and has a predetermined shooting condition included among the different shooting conditions with a noise-reduced image that has the predetermined shooting condition and has already been generated; compositing the image signal that has the predetermined shooting condition with the noise-reduced image that has the predetermined shooting condition and has already been generated using the composition rate, thereby generating a new noise-reduced image that has the predetermined shooting condition; and compositing the new noise-reduced image that has been generated with respect to the predetermined shooting condition and an image signal that has another shooting condition, wherein the determining determines the composition rate in accordance with an inter-frame change amount of the image signal that has the predetermined shooting condition and a parameter indicating the predetermined shooting condition.

According to the present invention, it is possible to generate a composite image in which, even if a moving subject exists, an unpleasant impression caused by motion has been reduced when generating the composite image using shot moving images.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a block diagram showing an exemplary functional configuration of an image processing circuit according to the first embodiment.

FIG. 5 is a block diagram showing an exemplary functional configuration of an NR processing circuit according to the first embodiment.

FIGS. 11A to 11C are diagrams illustrating the advantageous effects achieved by a configuration of the first embodiment.

DESCRIPTION OF THE EMBODIMENTS

First Embodiment

Below, an exemplary embodiment of the present invention will be described in detail with reference to the drawings. Note that the following describes, as one example of an image capturing system, an example of a surveillance camera system that can generate a composite image using image signals shot under different shooting conditions. However, the present embodiment can be applied to an electronic device that can generate a composite image through the obtainment of image signals shot under different shooting conditions. Therefore, such an electronic device is not limited to a surveillance camera, and may be a digital camera or a digital video camera. Alternatively, such an electronic device may be various types of mobile terminals, such as a smartphone and a tablet terminal, having a camera function, a game device, a timepiece-shaped or eyeglass-shaped information terminal, an industrial camera, an onboard camera, a medical camera, or the like.

Figure 1A:
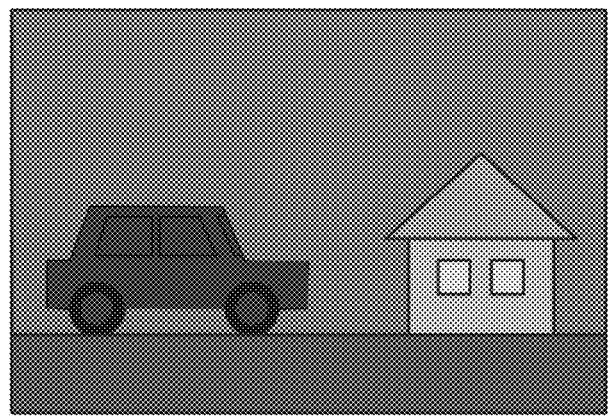
FIGS. 1A to 1C are diagrams illustrating a problem with the generation of a WDR composite image.
Figure 1B:
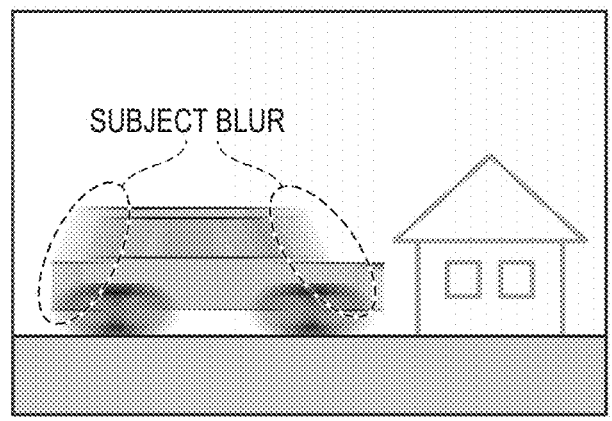
Figure 1C:
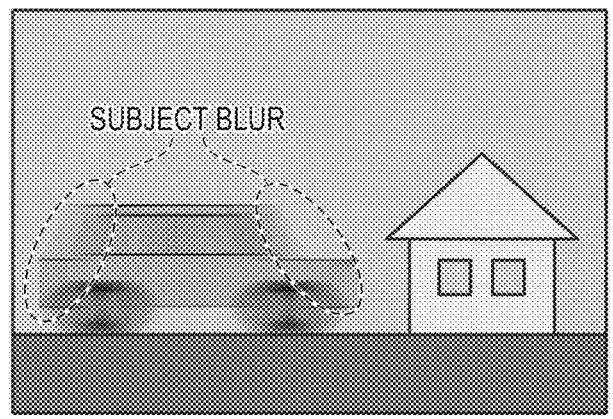
Figure 2:
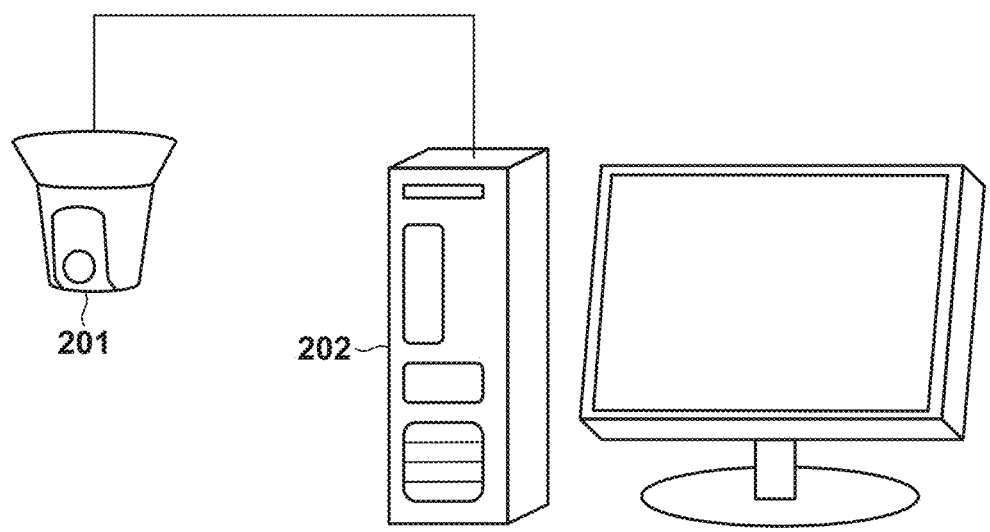
FIG. 2 is a diagram showing an exemplary system configuration of an image capturing system according to a first embodiment.

FIG. 2 shows an exemplary system configuration of an image capturing system according to the present embodiment. The image capturing system is composed of a surveillance camera 201 that captures moving images and performs image processing, and a client apparatus 202 which is connected via an IP network in a mutually communicable state and on which moving images transmitted from the surveillance camera 201 are viewed or recorded. Although the following describes an example in which the surveillance camera 201 has the functions of an image processing apparatus of the present embodiment, the client apparatus 202 may be configured to have the functions of the image processing apparatus of the present embodiment.

(Configuration of Surveillance Camera)

Figure 3:
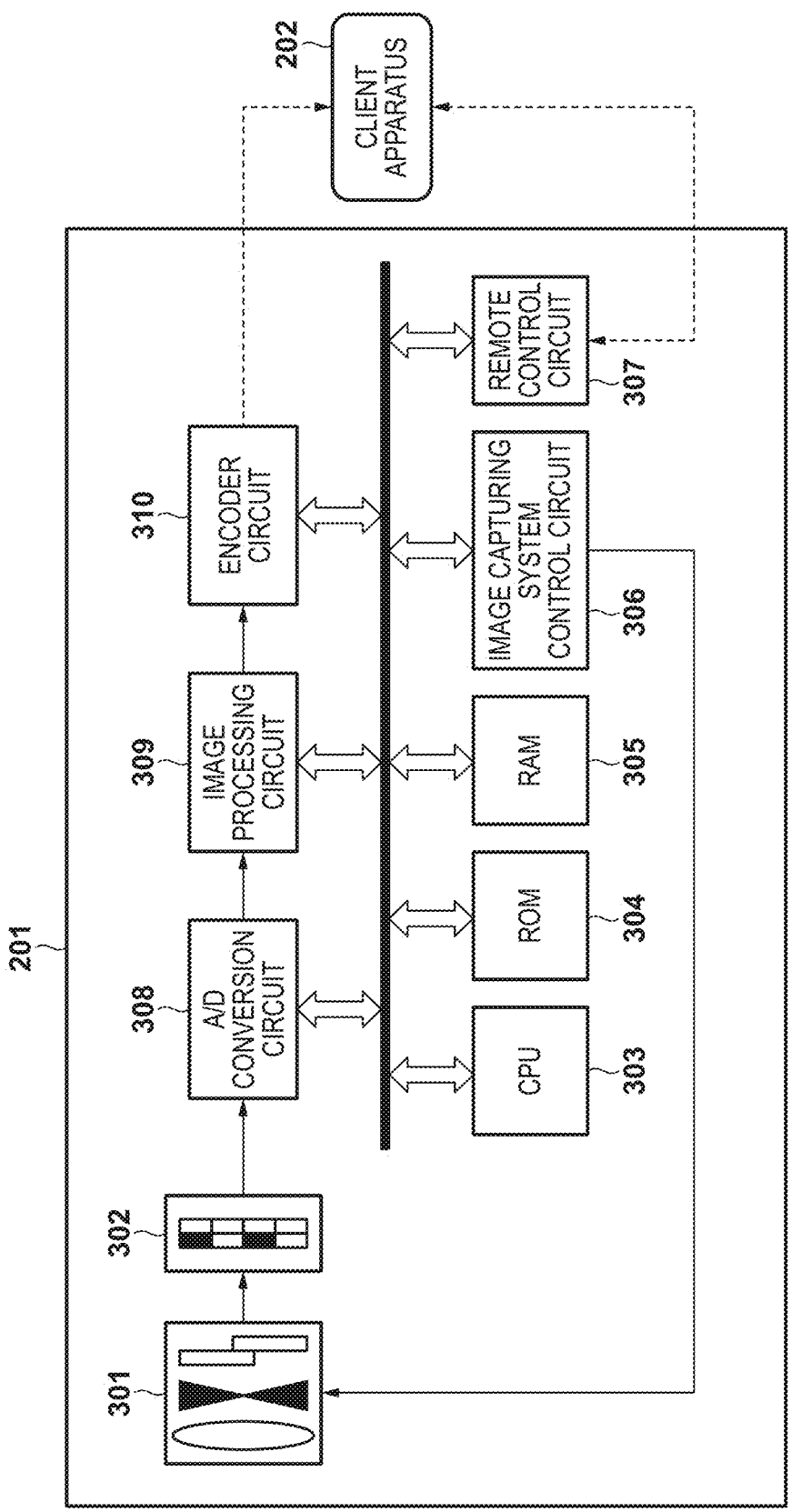
FIG. 3 is a block diagram showing an exemplary functional configuration of a surveillance camera as one example of an image capturing apparatus according to the first embodiment.

Next, an exemplary functional configuration of the surveillance camera 201 of the present embodiment will be described with reference to FIG. 3. An image capturing optical system 301 is configured to include a zoom lens, a focusing lens, a blur correction lens, a diaphragm, a shutter, and the like, and forms an optical image of a subject and the like (image formation) onto an image capturing plane of an image sensor unit 302. The image sensor unit 302 is a color image sensor configured to include an image sensor that converts light incident on the image capturing plane into an electrical signal, and color filters that respectively correspond to pixels of the image sensor. The image sensor unit 302 receives, through the image sensor, light that has been transmitted through the color filters and incident on the image capturing plane, converts the light into an electrical signal, and outputs the electrical signal. Note that the image sensor unit 302 is an image sensor that can set an arbitrary exposure period with respect to all pixels. In the case of the surveillance camera 201 of the present embodiment, the image sensor unit 302 captures moving images, and outputs image signals that respectively compose frames that are consecutive on a time axis.

A CPU 303 includes a processor for computation, and controls the operations of each component of the surveillance camera 201. The CPU 303 controls the operations of each component by deploying commands of programs stored in a ROM (Read Only Memory) 304 into a RAM (Random Access Memory) 305 and executing the commands. The ROM 304 includes, for example, a nonvolatile memory, such as a semiconductor memory, and stores programs executed by the CPU 303 and various types of setting values. The RAM 305 includes, for example, a volatile memory, such as a DRAM, is a location into which programs stored in the ROM 304 are deployed, temporarily stores data during processing in each constituent, and so forth.

An image capturing system control circuit 306 performs various types of control, such as focusing of the image capturing optical system 301, opening and closing of the shutter, and diaphragm adjustment, based on such instructions as a focus control instruction, a shutter control instruction, and a diaphragm control instruction supplied from the CPU 303. A remote control circuit 307 controls each component via the CPU 303 based on an instruction from the client apparatus 202.

An A/D conversion circuit 308 converts an analog electrical signal obtained through photoelectric conversion performed by the image sensor unit 302 (an analog image capturing signal) into a digital signal value. The digital signal value obtained through the analog-digital conversion performed by the A/D conversion circuit 308 is transmitted to an image processing circuit 309 as an image signal of each frame of moving images. The image processing circuit 309 applies later-described image processing, such as noise reduction processing, to the input image signal. Using the image signal after the image processing performed by the image processing circuit 309, an encoder circuit 310 performs processing of conversion into a predetermined file format, such as JPEG, H.264/H.265, and the like (i.e., encoding processing). The image signal after the encoding processing performed by this encoder circuit 310 is transmitted to the client apparatus 202 via a non-illustrated communication circuit.

(Configuration of Image Processing Circuit 309)

Next, an exemplary functional configuration of the image processing circuit 309 of the present embodiment will be described with reference to FIG. 4. An image signal of each frame of moving images, which has been captured by the image sensor unit 302 and has further undergone the analog-digital conversion in the A/D conversion circuit 308 as described above, is input to an image input terminal 401. In a case where WDR processing is to be executed, a long exposure image and a short exposure image that were shot with different exposure periods (i.e., image signals that were shot under different shooting conditions) sequentially input to the image input terminal 401. Although it is assumed in the present embodiment that these images are input using time division, no limitation is intended in this regard, and a configuration that obtains a long exposure image and a short exposure image simultaneously for each sensor line may be assumed.

A development processing circuit 402 performs processing related to demosaicing, white balance, gamma, sharpness, and the like with respect to captured image data input to the image input terminal 401. An NR (noise reduction) processing circuit 403 is composed of a cyclic NR processing circuit 501 that applies a filter of a time direction, and a spatial NR processing circuit 502 that applies a filter of a spatial direction, as shown in FIG. 5. The NR processing circuit 403 reduces random noise generated in the time direction and the spatial direction by applying these two types of NR processing. The detailed configuration and operations of the cyclic NR processing circuit 501 according to the present embodiment will be described later.

A WDR processing circuit 404 generates one WDR composite image by compositing a plurality of images with different exposure periods from which noise has been reduced by the NR processing circuit 403. Regarding a composition rate at the time of composition of images that were captured with different exposure periods, for example, a composition rate of a short exposure image is set to be high with respect to a blown-out highlight region in a long exposure image, whereas a composition rate of a long exposure image is set to be high with respect to a blocked-up shadow region in a short exposure image. Note that a calculation method for a composition rate is not limited by this, and various calculation methods can be used, such as a calculation method based on a result of motion compensation, and a calculation method based on a noise amount. An image output terminal 405 outputs the WDR composite image output from the WDR processing circuit 404 to the encoder circuit 310.

(Configuration of Cyclic NR Processing Circuit)

Next, the cyclic NR processing circuit 501 will be described. Before giving a detailed description of the cyclic NR processing circuit 501, an outline of cyclic noise reduction processing will be described.

An input signal and an output signal of a frame at time n>2 are respectively expressed as IN(v, h, n) and OUT(v, h, n), an output signal of a frame in the same two-dimensional position at time n−1 is expressed as OUT (v, h, n−1), and $\alpha$ ($0 \leq \alpha \leq 1$) is used as a cyclic coefficient for a target signal.

The output signal OUT(v, h, n) after the application of the cyclic noise reduction processing is calculated through computation of weighted addition of expression (1). Here, it is assumed that v and h indicate coordinate positions in the horizontal direction and the vertical direction within a frame, and the output signal of the frame at n=1 is the same as the input signal of the same.

$$OUT(v,h,n)=(1-\alpha)\times IN(v,h,n)+\alpha\times OUT(v,h,n-1) \quad \text{Expression (1)}$$

Here, when the input signal has a small inter-frame change amount, the cyclic coefficient $\alpha$, which is a weight, is set to be large so as to reduce noise in a still subject portion intensely. That is to say, as an inter-frame difference signal in a still subject portion, which has a high inter-frame correlation, represents noise, the cyclic coefficient $\alpha$ is set to be large so as to reduce noise intensely.

On the other hand, when the input signal has a large inter-frame change amount, the weight indicated by the cyclic coefficient $\alpha$ is set to be small so that the inter-frame difference signal is less likely to be reduced from the input signal, and hence signal components of a moving subject are stored. Note that should a large cyclic coefficient $\alpha$ be set with respect to a moving subject, components of the moving subject are reduced intensely from an input image. By thus setting a cyclic coefficient in accordance with a resultant inter-frame change amount, the visibility of a moving subject can be maintained while reducing noise on a still subject.

In relation to the aforementioned cyclic noise reduction processing, the cyclic NR processing circuit 501 according to the present embodiment determines a cyclic coefficient based on not only an inter-frame change amount, but also an exposure period of an input image, in order to alleviate an unpleasant impression created around a moving subject in a post-composition WDR composite image.

Figure 6:
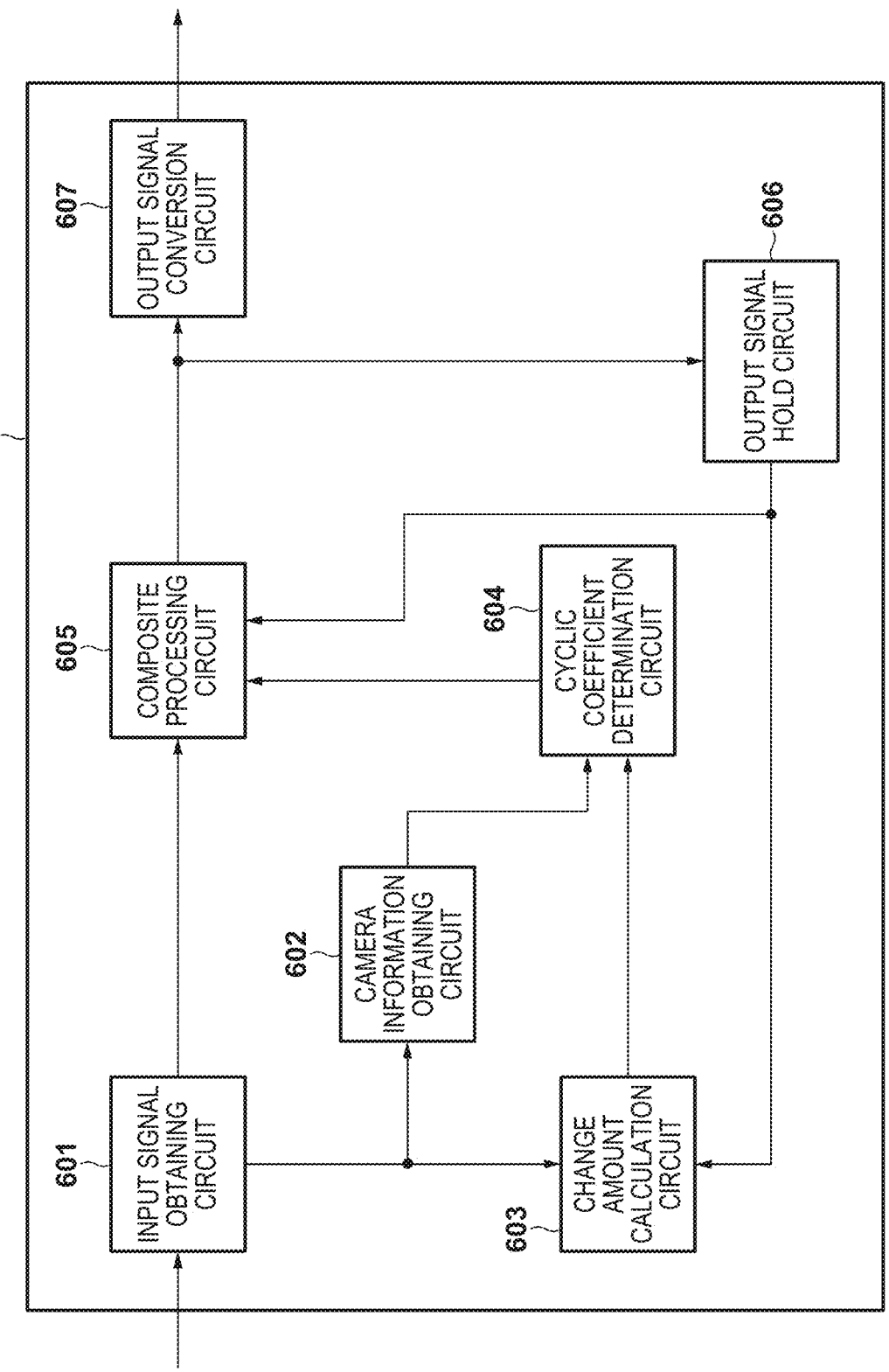
FIG. 6 is a block diagram showing an exemplary functional configuration of a cyclic NR processing circuit according to the first embodiment.

FIG. 6 shows an exemplary configuration of the cyclic NR processing circuit 501 that is intended to apply cyclic NR processing of the present embodiment to input signals of moving images. The cyclic NR processing of the present embodiment is composed of an input signal obtaining circuit 601, a camera information obtaining circuit 602, a change amount calculation circuit 603, a cyclic coefficient determination circuit 604, a composite processing circuit 605, an output signal hold circuit 606, and an output signal conversion circuit 607.

The input signal obtaining circuit 601 sequentially obtains a plurality of input signals with different exposure periods, and outputs them to the change amount calculation circuit 603 and the composite processing circuit 605. The camera information obtaining circuit 602 obtains the exposure periods of the plurality of input signals obtained by the input signal obtaining circuit 601. The change amount calculation circuit 603 calculates an inter-frame change amount for each of the input signals with different exposure periods.

The cyclic coefficient determination circuit 604 determines a cyclic coefficient for each of the input signals with different exposure periods in accordance with the inter-frame change amounts input from the change amount calculation circuit 603 and the exposure periods obtained from the camera information obtaining circuit 602. For each exposure period, the composite processing circuit 605 composites, based on the determined cyclic coefficient, the input signal obtained from the input signal obtaining circuit 601 and an output signal of an immediately preceding frame that has been temporarily stored and has the same exposure period as the input signal, and applies the cyclic NR processing. That is to say, the composite processing circuit 605 outputs an output signal of a current frame to which the cyclic NR processing has been applied.

The output signal hold circuit 606 temporarily stores the output signal from the composite processing circuit 605 into a non-illustrated frame memory. The output signal conversion circuit 607 sequentially outputs a plurality of output signals with different exposure periods from the composite processing circuit 605 to the WDR processing circuit 404.

(Sequence of Operations Pertaining to Noise Reduction Processing)

Figure 7:
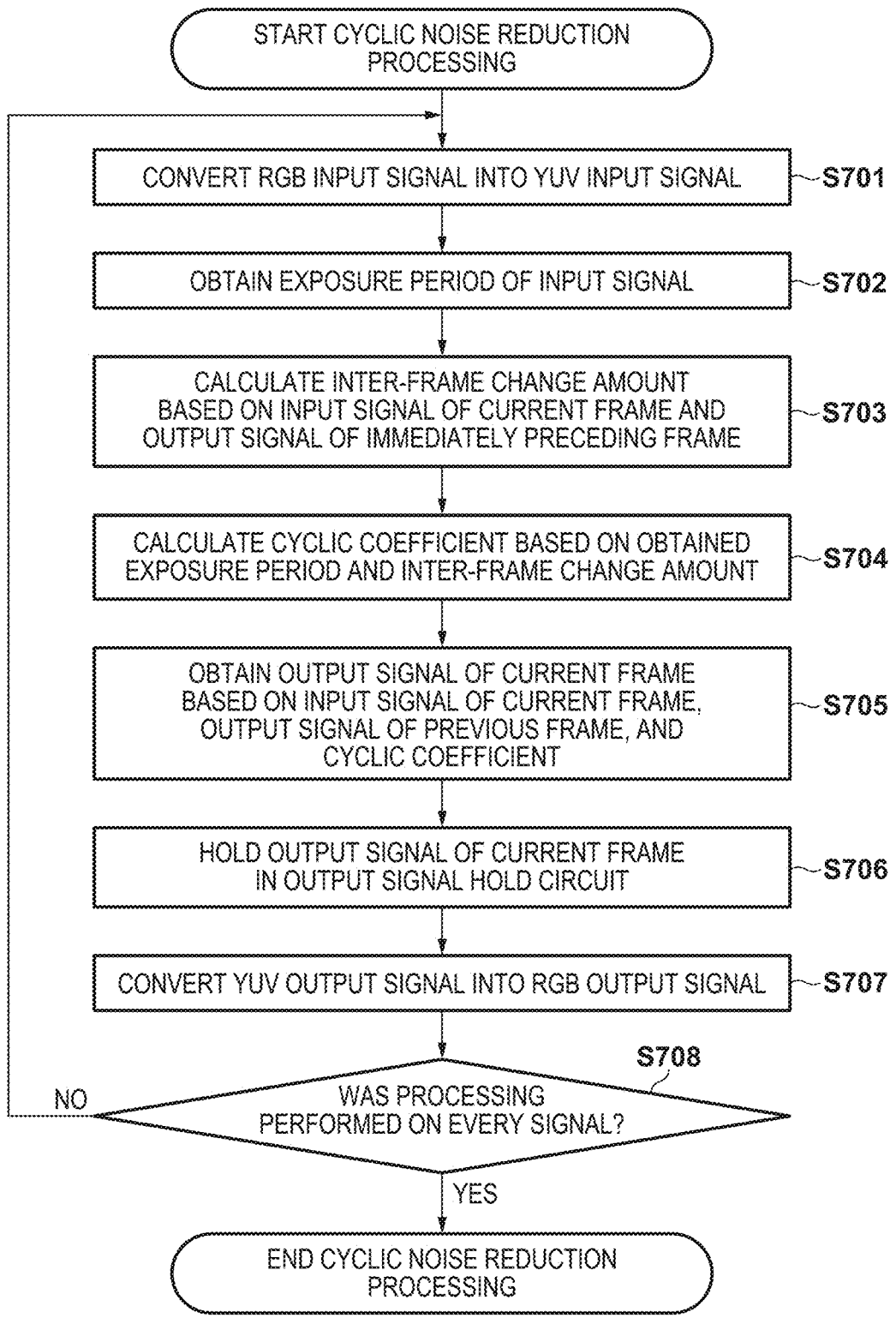
FIG. 7 is a flowchart showing a sequence of operations of cyclic NR processing according to the first embodiment.

A description is now given of a sequence of operations of noise reduction processing in the cyclic NR processing circuit 501 with reference to FIG. 7. Note that the sequence of operations of the noise reduction processing is realized by hardware of the image processing circuit 309, or by the CPU 303 or the image processing circuit 309 executing a program recorded in the ROM 304.

In step S701, the input signal obtaining circuit 601 sequentially obtains a plurality of input signals with different exposure periods (that is to say, image signals that were shot under different shooting conditions) from moving image data, and converts them into appropriate signal components. For example, in a case where the cyclic NR processing is executed with the conversion of RGB signals input from the development processing circuit 402 into YIN signals, the input signal obtaining circuit 601 converts the input signals in accordance with conversion formulae of expression (2).

$$Y=0.299\times R+0.587\times G+0.114\times B$$

$$U=-0.169\times R-0.331\times G+0.500\times B$$

$$V=0.500\times R-0.419\times G+0.081\times B \quad \text{Expression (2)}$$

Figure 8:
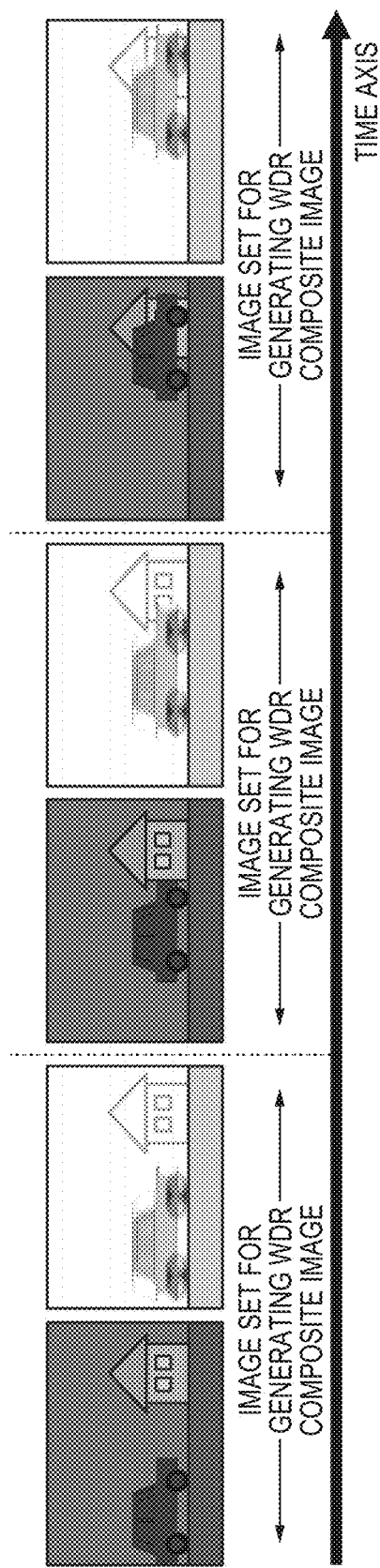
FIG. 8 is a diagram illustrating one example of a sequence of input signals according to the first embodiment.

In step S702, the camera information obtaining circuit 602 obtains camera information (i.e., a parameter indicating a shooting condition) for each of the input signals that are sequentially obtained. In the present embodiment, the camera information obtaining circuit 602 obtains, for example, exposure periods of the images that are sequentially obtained. FIG. 8 shows an example in which a short exposure image and a long exposure image that were shot with two different types of exposure periods are input repeatedly. The camera information obtaining circuit 602 obtains the exposure periods of the respective input images. Note that an image set for generating a WDR composite image is not limited to two types as shower in FIG. 8; for example, three or more types of images with different exposure periods may be used. Furthermore, moving image data may not include only one type of moving images; short exposure images and long exposure images may be included in separate types of moving images that have been synchronized with each other, and input signals may be extracted from each type of moving images.

In step S703, the change amount calculation circuit 603 reads out an input signal obtained from the input signal obtaining circuit 601 and an output signal of an immediately preceding frame that has the same exposure period (i.e., the same shooting condition) as the input signal from a non-illustrated frame memory, and calculates a change amount on a per-component basis, in the present embodiment, for example, an absolute difference value is calculated as a change amount as in expression (3). Note that no limitation is intended in this regard, and it goes without saying that a squared difference value, an absolute difference value of a low-frequency or high-frequency component, or the like may be calculated as a change amount.

$$\Delta Y_L(v,h,n)=|Y_L(v,h,n)-Y_L(v,h,n-1)|$$

$$\Delta Y_S(v,h,n)=|Y_S(v,h,n)-Y_S(v,h,n-1)| \quad \text{Expression (3)}$$

Here, $Y_L$ (v, h, n) denotes an input signal of a long exposure image, h, n−1) denotes an output signal of a long exposure image, and $\Delta Y_L$ (v, h, n) denotes an inter-frame change amount of a long exposure image. Also, $Y_S$ (v, h, n) denotes an input signal of a short exposure image, $Y_S$ (v, h, n−1) denotes an output signal of a short exposure image, and $\Delta Y_S$ (v, h, n) denotes an inter-frame change amount of a short exposure image. Although processing for a luminance component is representatively given in expression (3), similar processing is performed with respect to a color (UV) component as well.

In step S704, the cyclic coefficient determination circuit 604 calculates a cyclic coefficient for each of the different exposure periods based on the exposure periods input from the camera information obtaining circuit 602 and the change amount calculation circuit 603. Below, the process of calculating a cyclic coefficient will be described in detail.

First, the cyclic coefficient determination circuit 604 obtains the exposure periods input from the camera information obtaining circuit 602, and determines thresholds TH, moving subject cyclic coefficients α1, and still subject cyclic coefficients α2 corresponding to a long exposure image and a short exposure image as shown in expressions (4), (5). The cyclic coefficient determination circuit 604 makes the moving subject cyclic coefficient, the still subject cyclic coefficient ($\alpha 1_L$, $\alpha 2_L$), and the threshold ($TH_L$) intended for long exposure larger than the moving subject cyclic coefficient, the still subject cyclic coefficient ($\alpha 1_S$, $\alpha 2_S$) and the threshold ($TH_S$) intended for short exposure.

Especially in the present embodiment, as shown in expression (4), the cyclic coefficient $\alpha 2_L$ intended for long exposure is set to a value larger than 0.5 in order to alleviate the influence of a moving subject in a long exposure image of a WDR composite image, its advantageous effects will be described later.

$$0.0 \leq \alpha 1_S < \alpha 2_S < 0.5 < \alpha 1_L < \alpha 2_L \leq 1.0 \quad \text{Expression (4)}$$

$$0 \leq TH_S < TH_L \leq 255 \quad \text{Expression (5)}$$

As shown in expression (4), the cyclic coefficients can take a value in a range of 0 to 1, inclusive, and the thresholds of an inter-frame change amount are given in expression (5) assuming an absolute difference value (from 0 to 255, inclusive) of an 8-bit signal as an example. For these thresholds, still subject cyclic coefficients, and moving subject cyclic coefficients, various calculation methods can be used, such as a calculation method based on a difference or ratio between exposure periods and a method that reads out values that have been set in a memory in advance, as long as the relationship of expression (4) is satisfied. Furthermore, when three or more types of input signals with different exposure periods are input, the cyclic coefficients and threshold for exposure of longer seconds are set to be larger than those for exposure of shorter seconds in accordance with information of exposure periods.

Figure 9:
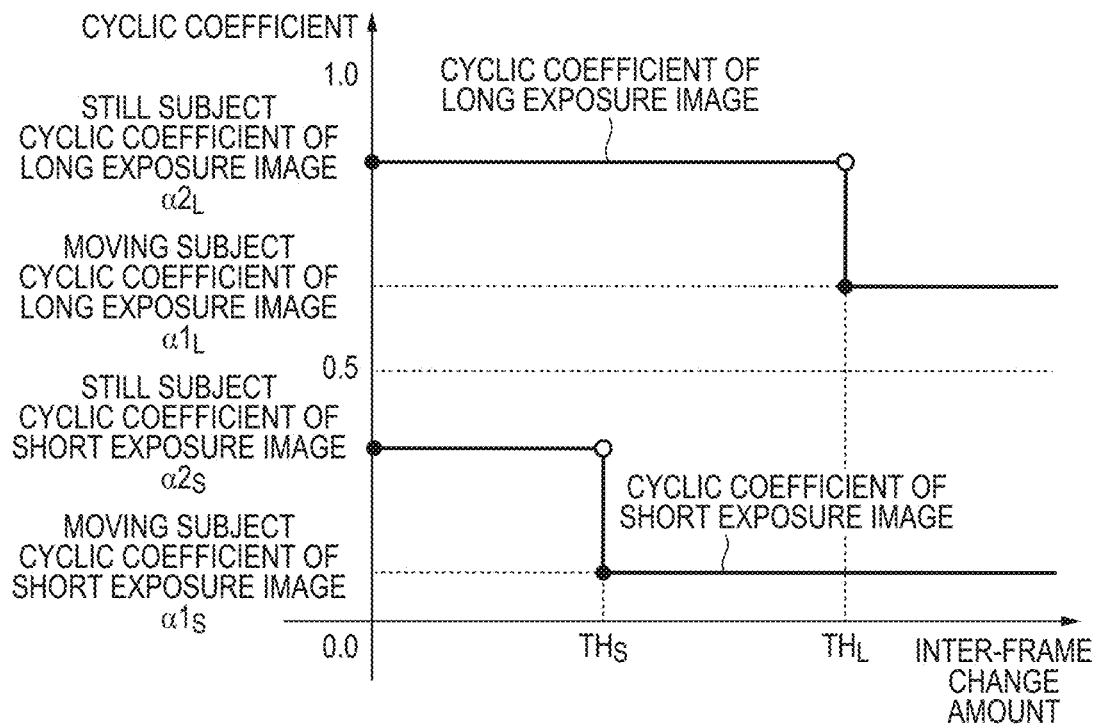
FIG. 9 is a diagram showing a relationship between an inter-frame change amount and a cyclic coefficient according to the first embodiment using polygonal chains.

When an input signal is a short exposure image, a cyclic coefficient is determined based on the cyclic coefficients $\alpha 1_S$, $\alpha 2_S$ and the threshold $TH_S$ of a change amount intended for the short exposure image, and on a frame change amount $\Delta D_S$ (v, h) of the short exposure image input from the change amount calculation circuit 603. Specifically, as shown in FIG. 9, when the frame change amount (horizontal axis) is smaller than the threshold $TH_S$, the coordinate position (v, h) is interpreted as a still subject, and the cyclic coefficient is set to have a large value. On the other hand, when the value of the inter-frame change amount is equal to or larger than $TH_S$, the coordinate position (v, h) is interpreted as a moving subject, and the cyclic coefficient is set to have a small value.

When an input signal is a long exposure image, a cyclic coefficient is set based on the cyclic coefficients $\alpha 1_L$, $\alpha 2_L$ and the threshold $TH_L$ intended for the long exposure image, and on a frame change amount $\Delta Y_L$ (v, h) of the long exposure period input from the change amount calculation circuit 603.

Figure 10:
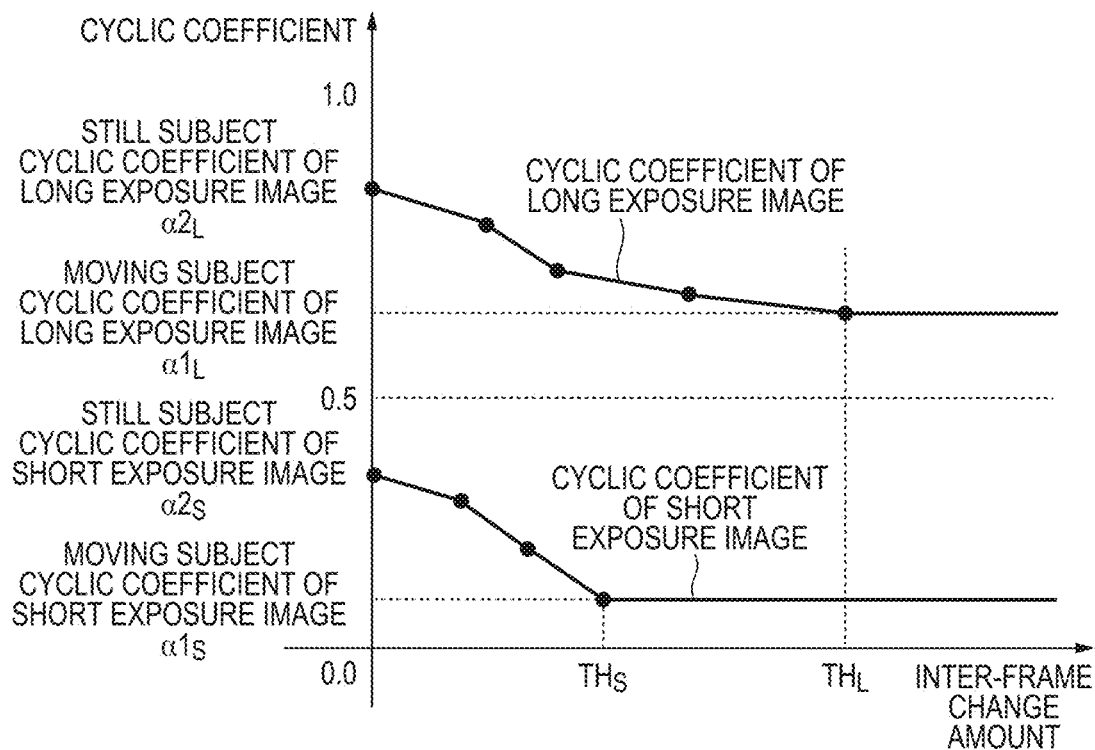
FIG. 10 is a diagram showing a relationship between an inter-frame change amount and a cyclic coefficient according to the first embodiment using a plurality of polygonal chains.

As shown in FIG. 9, as the cyclic coefficient for the long exposure image takes the value of $\alpha 1_L$ or $\alpha 2_L$, its value is larger than $\alpha 1_S$ or $\alpha 2_S$ taken by the cyclic coefficient for the short exposure image, and hence more intense noise reduction effects are expected. That is to say, in the long exposure image, signals that exhibit a change (i.e., a moving subject portion) are reduced more intensely than in the short exposure image. Note that setting two or more thresholds also makes it possible to set the cyclic coefficient smoothly in accordance with the inter-frame change amount as shown in FIG. 10. The cyclic coefficient is determined through the above-described processing.

In step S705, an output signal of an immediately preceding frame that has the same exposure period (i.e., the same shooting condition) as the input signal obtained from the input signal obtaining circuit 601 is read out from the output signal hold circuit 606. Then, based on the value of the cyclic coefficient output from the cyclic coefficient determination circuit 604, the input signal and the output signal of the frame are composited, thereby obtaining the output signal to which the cyclic NR processing has been applied.

In step S706, the output signal hold circuit 606 holds the output signal obtained in step S705. In step S707, the output signal conversion circuit 607 obtains the YUN output signal, and converts the same into an RGB output signal using conversion formulae of expression (6).

$$R = 1.00 \times Y + 1.402 \times V$$
$$G = 1.00 \times Y - 0.334 \times U - 0.714 \times V$$
$$B = 1.00 \times Y - 1.772 \times U \quad \text{Expression (6)}$$

The cyclic NR processing according to the present embodiment can be carried out by performing the processing of steps S701 to S707 described above with respect to all input signals. In this way, while sequentially obtaining image signals that were shot under different shooting conditions, the cyclic NR processing circuit 501 calculates parameters that indicate the shooting conditions (i.e., exposure periods) and an amount of change between frames that were respectively shot under the shooting conditions. Then, a cyclic coefficient to be applied to image signals that were shot under the same shooting condition is determined based on the aforementioned parameter indicating the shooting condition and inter-frame change amount (for each shooting condition). By applying the determined cyclic coefficient to an input signal and the output signal of an immediately preceding frame that were shot under the same shooting condition, a noise-reduced image can be obtained for each of the different shooting conditions.

Next, with reference to FIGS. 11A to 11C, a description is given of the advantageous effects of a WDR composite image that is obtained using a plurality of images with different exposure periods to which the cyclic NR processing of the present embodiment has been applied, in the cyclic NR processing for a short exposure image, as the moving subject cyclic coefficient is smaller than 0.5 as shown in expression (4), the cyclic NR processing is applied relatively mildly in a region that has been determined to be a moving subject. Therefore, as shown in FIG. 11A, an output signal from which noise has been reduced can be obtained while signal components of the moving subject are maintained in an image to which the cyclic NR processing has been applied, similarly to conventional cyclic NR processing.

On the other hand, the cyclic coefficient and threshold for a long exposure image are set to have larger values than those for a short exposure image; especially, the moving subject cyclic coefficient is set to be larger than 0.5 as shown in expression (4). Therefore, a moving subject portion is reduced more intensely, and signal components of a moving subject are less likely to be maintained. In other words, by applying the cyclic NR processing intensely to an entire image, signal components of the moving subject easily assimilate into a still subject (background), and an output signal in which signals of the moving subject have disappeared is obtained, as shown in FIG. 11B.

In this way, in WDR processing that uses a short exposure image and a long exposure image to which the cyclic NR processing of the present embodiment has been applied, the influence of subject blur that has occurred in the long exposure period is alleviated as shown in FIG. 11C. Furthermore, ghosting of a WDR composite image can be suppressed with a low calculation cost. That is to say, it is possible to generate a composite image in which, even if a moving subject exists, an unpleasant impression caused by motion has been reduced when generating the composite image using shot moving images.

Although the cyclic NR processing is executed with respect to a YUV data format in the present embodiment, no particular limitation is intended in this regard. Similar processing can be executed with respect to various signal components, such as RGB components, Lab components, and the like, by executing appropriate conversion in the input signal obtaining circuit 601, Furthermore, although the cyclic NR processing is executed also with respect to a short exposure image in the present embodiment, it is possible to adopt a configuration in which the cyclic NR processing is executed only with respect to a long exposure image for the purpose of suppressing ghosting in a WDR processing image.

Second Embodiment

The first embodiment has been described in relation to a method in which cyclic NR processing and composition processing are executed with respect to a plurality of visible light images with different exposure periods at the time of WDR processing. In a second embodiment, cyclic NR processing and composition processing are executed with respect to a plurality of input images of different wavelengths obtained from sensors for visible light signals and invisible light signals. Note that the constituents that are identical or substantially identical to those of the first embodiment are given the same reference signs thereas, and their descriptions will be omitted; the following description focuses on the differences.

Figure 12:
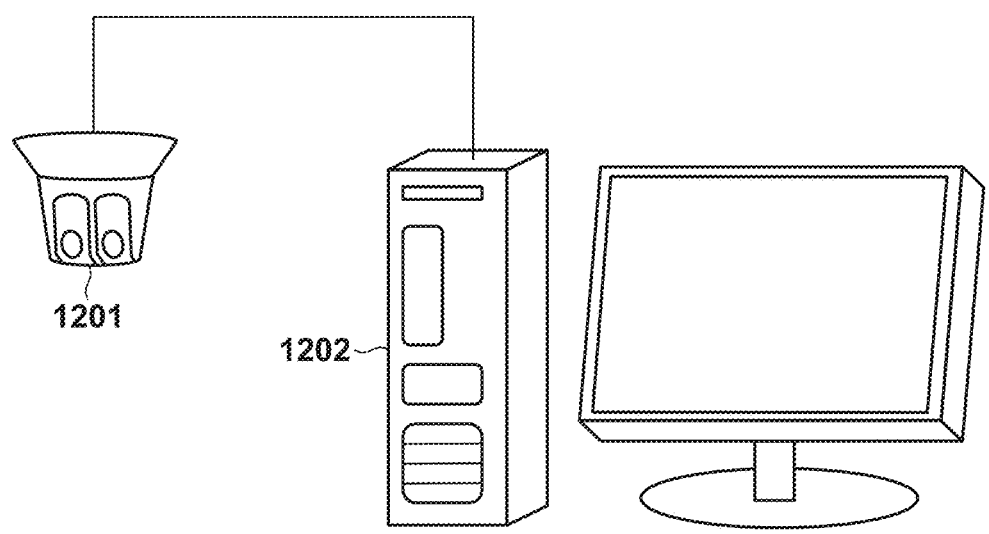
FIG. 12 is a block diagram showing an exemplary configuration of an image capturing system according to a second embodiment.

FIG. 12 shows an exemplary system configuration of an image capturing system according to the present embodiment. The image capturing system shown in FIG. 12 is composed of a surveillance camera 1201 that obtains visible light signals and invisible light signals as an apparatus that captures moving images and performs image processing, and a client apparatus 1202 that is connected via an IP network in a mutually communicable state. Although the following describes an example in which the surveillance camera 1201 has the functions of an image processing apparatus of the present embodiment, the client apparatus 1202 may be configured to have the functions of the image processing apparatus of the present embodiment. Note that the surveillance camera 1201 is not limited to being constituted by a multi-ocular lens and a plurality of sensors. For example, the surveillance camera may be constituted by a single lens and sensor, may use a sensor that is sensitive to the ranges of visible light signals and invisible light signals, and may be configured to separate into visible light signals and invisible light signals and obtain them with a dichroic mirror and the like provided inside the surveillance camera.

(Configuration of Surveillance Camera)

Figure 13:
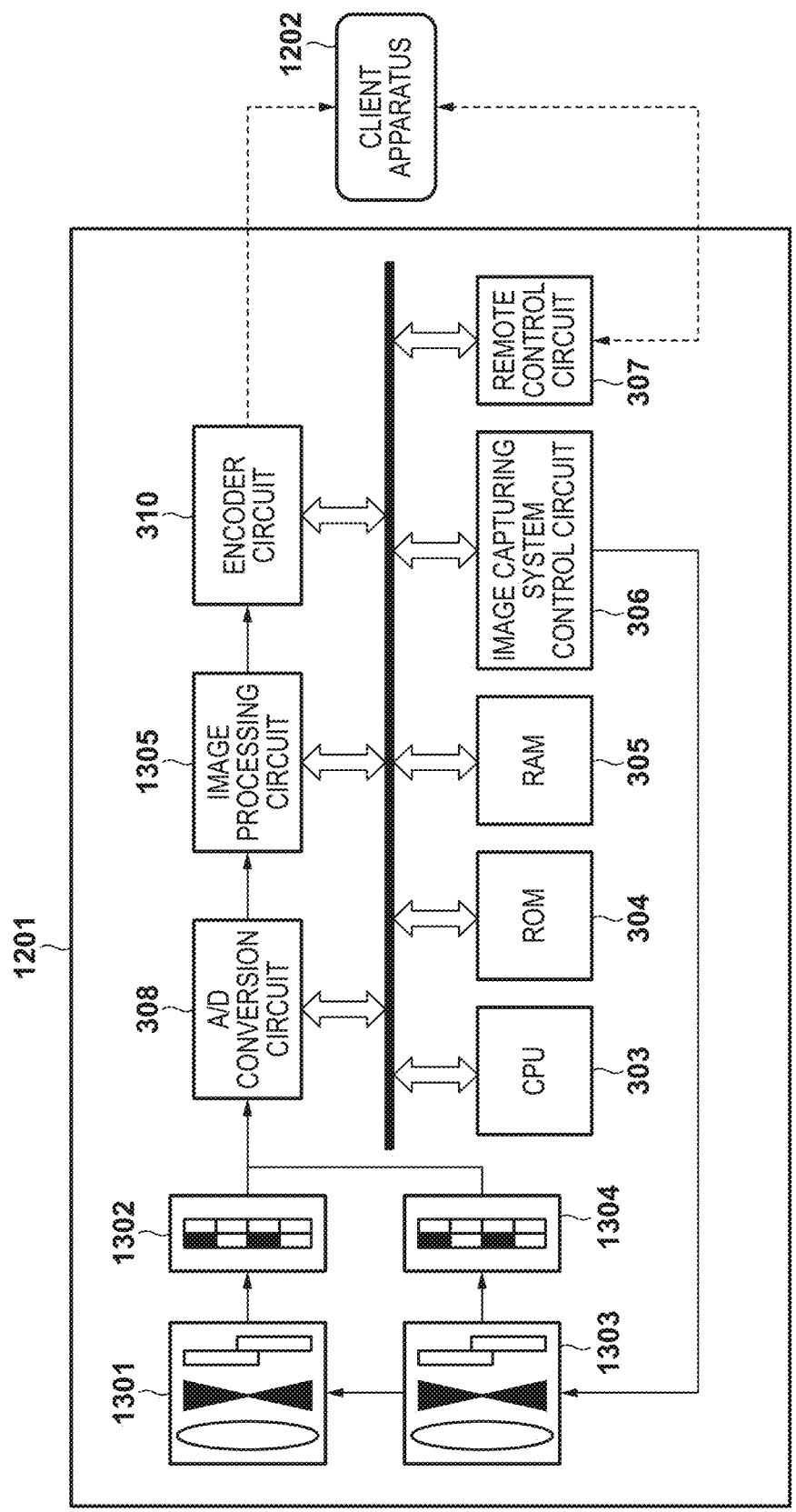
FIG. 13 is a block diagram showing an exemplary functional configuration of a surveillance camera as one example of an image capturing apparatus according to the second embodiment.

Next, an exemplary functional configuration of the surveillance camera 1201 of the present embodiment will be described with reference to FIG. 13. An image capturing optical system 1301, which obtains visible light signals, is configured to include a zoom lens, a focusing lens, a blur correction lens, a diaphragm, a shutter, and the like, and forms an optical image of a subject and the like (image formation) onto an image capturing plane of an image sensor unit 1302 that is sensitive to the range of visible light signals. An image capturing optical system 1303 that obtains invisible light signals and an image sensor unit 1304 that is sensitive to invisible light signals are configured similarly to the image capturing optical system 1301 that obtains visible light signals and the image sensor unit 1302, except for the sensitivity property. The image processing circuit 1305 executes NR processing and composition processing with respect to visible light signals and invisible light signals. The following describes differences related to the configuration and processing of the image processing circuit 1305.

Figure 14:
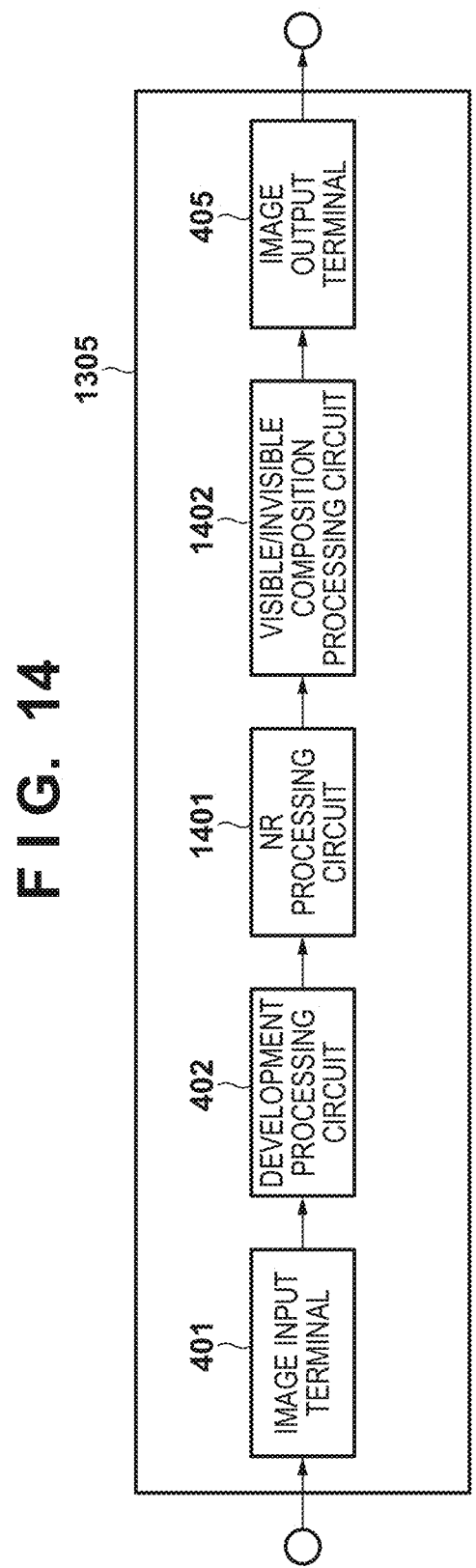
FIG. 14 is a block diagram showing an exemplary functional configuration of an image processing circuit according to the second embodiment.

FIG. 14 shows an exemplary functional configuration of the image processing circuit 1305 of the present embodiment. The image processing circuit 1305 differs from the first embodiment in an NR processing circuit 1401 and a visible/invisible composition processing circuit 1402. The NR processing circuit 1401 is configured similarly to the first embodiment, and includes a cyclic NR processing circuit 501 that applies a filter of a time direction, and a spatial NR processing circuit 502 that applies a filter of a spatial direction, as shown in FIG. 5. Through these two types of NR processing, NR processing that reduces random noise generated in the time direction and the spatial direction is performed. The detailed configuration and operations of the cyclic NR processing circuit 501 of the present embodiment will be described later.

The visible/invisible composition processing circuit 1402 generates one composite image by compositing a plurality of images of different wavelengths from which noise has been reduced by the NR processing circuit 1401. As a calculation method for a composition rate of different wavelengths, for example, in a low-illuminance environment, such as in darkness, the rate of an invisible light signal is set to be high in a region of a moving subject, and the rate of a visible light signal is set to be high in a motionless background region. Note that a calculation method is not limited to this, and various methods can be used, such as a calculation method based on noise amounts in a visible signal and an invisible signal, and a calculation method based on subject luminance.

The cyclic NR processing circuit 501 of the present embodiment determines a cyclic coefficient based on not only a resultant motion amount, but also wavelength information and a noise amount of an input image, in order to alleviate an unpleasant impression created around a moving subject of a composite image of a visible signal and an invisible signal.

(Configuration of Cyclic NR Processing Circuit)

Figure 15:
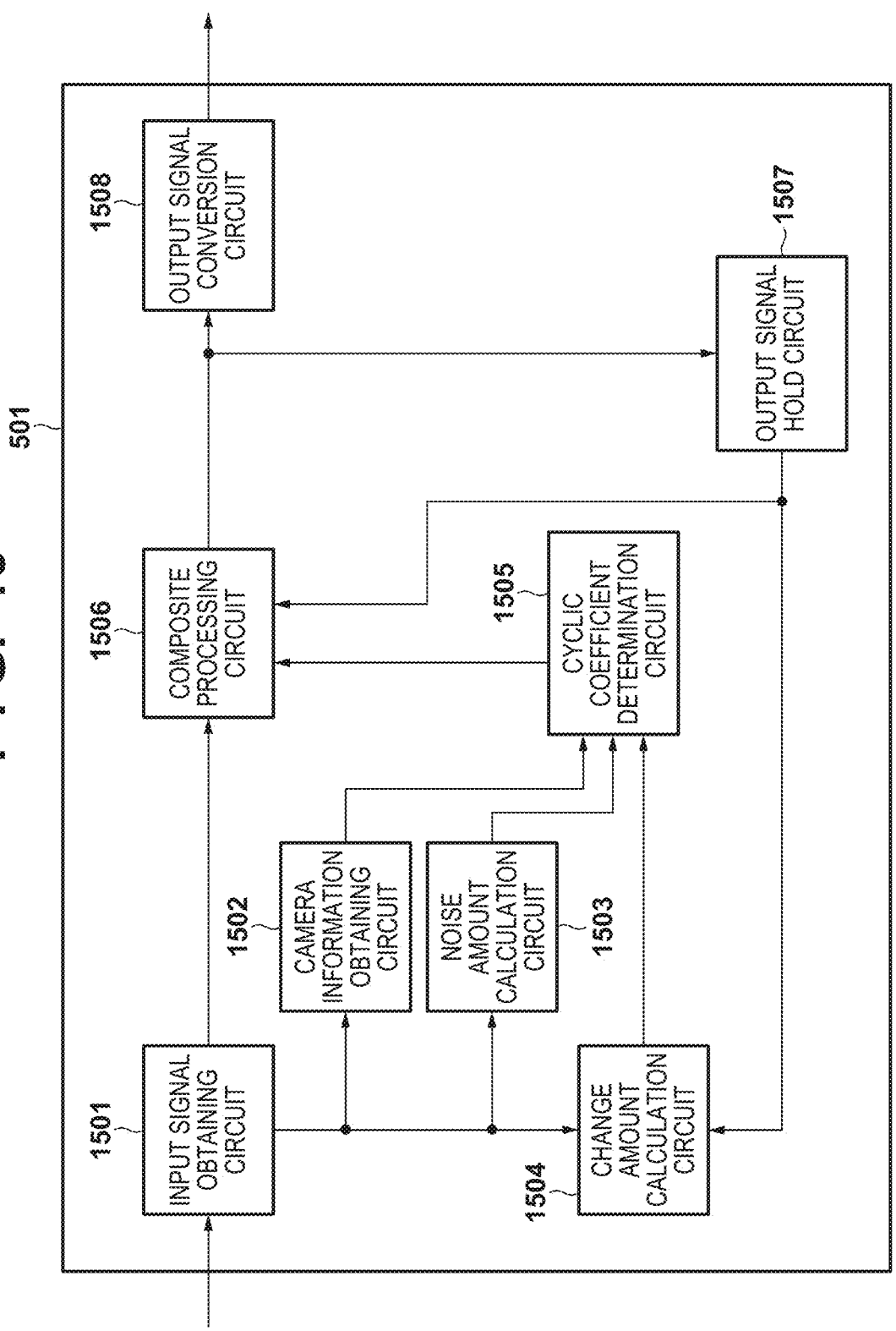
FIG. 15 is a block diagram showing an exemplary functional configuration of a cyclic NR processing circuit according to the second embodiment.

Next, with reference to FIG. 15, a description is given of the cyclic NR processing circuit 501 of the present embodiment that applies cyclic NR processing to a visible signal and an invisible signal and outputs the result. The cyclic NR processing of the present embodiment includes an input signal obtaining circuit 1501, a camera information obtaining circuit 1502, a noise amount calculation circuit 1503, a change amount calculation circuit 1504, a cyclic coefficient determination circuit 1505, a composite processing circuit 1506, an output signal hold circuit 1507, and an output signal conversion circuit 1508.

The input signal obtaining circuit 1501 sequentially obtains a plurality of input signals of different wavelengths, and outputs them to the camera information obtaining circuit 1502, noise amount calculation circuit 1503, change amount calculation circuit 1504, and composite processing circuit 1506. The camera information obtaining circuit 1502 obtains wavelength information (i.e., parameters indicating shooting conditions) of the signals obtained by the input signal obtaining circuit 1501. For example, the camera information obtaining circuit 1502 obtains whether the input signals have wavelengths in a visible range, or are signals in an invisible range with long wavelengths, such as near infrared and far infrared.

The noise amount calculation circuit 1503 calculates noise amounts of the obtained input signals of different wavelengths. The change amount calculation circuit 1504 calculates an inter-frame change amount for each wavelength. The cyclic coefficient determination circuit 1505 determines a cyclic coefficient in accordance with an inter-frame change amount input from the change amount calculation circuit 1504, wavelength information of a target input signal obtained from the camera information obtaining circuit 1502, and a noise amount obtained from the noise amount calculation circuit 1503.

The composite processing circuit 1506 reads out an input signal obtained from the input signal obtaining circuit 1501 and an output signal of an immediately preceding frame that has the same wavelength as the input signal from a non-illustrated frame memory, and composites them based on the value of the cyclic coefficient output from the cyclic coefficient determination circuit 1505. As a result, an output signal to which the cyclic NR processing has been applied can be obtained. The output signal hold circuit 1507 temporarily stores the output signal output from the composite processing circuit 1506 into the frame memory and the like. The output signal conversion circuit 1508 sequentially outputs, to the visible/invisible composite processing circuit 1402, composite images of different wavelengths that are output from the composite processing circuit 1506.

(Sequence of Operations Pertaining to Cyclic Noise Reduction Processing)

Figure 16:
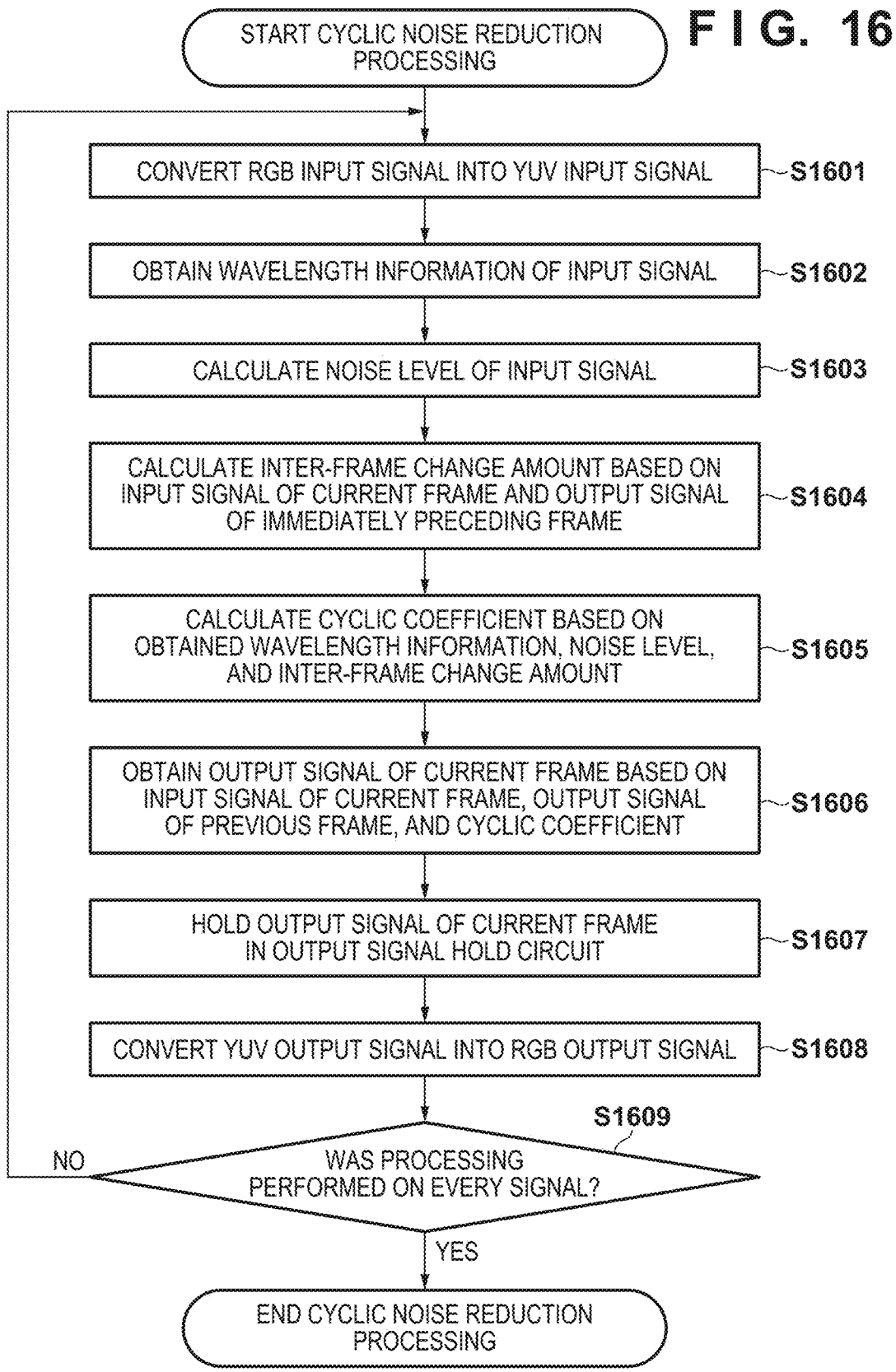
FIG. 16 is a flowchart showing a sequence of operations of cyclic NR processing according to the second embodiment.

Next, with reference to FIG. 16, a description is given of a sequence of operations pertaining to the cyclic noise reduction processing of the present embodiment. Note that the sequence of operations of the noise reduction processing is realized by hardware of the image processing circuit 309, or by the CPU 303 or the image processing circuit 1305 executing a program recorded in the ROM 304.

In step S1601, the input signal obtaining circuit 1501 sequentially obtains a plurality of input signals of different wavelengths, and converts them into appropriate signal components similarly to the first embodiment.

In step S1602, the camera information obtaining circuit 1502 obtains camera information (i.e., parameters indicating shooting conditions) of the obtained input signals. For example, wavelength information of the sequentially obtained images is obtained. Although it is assumed in the present embodiment that two types of signals of different wavelengths (a visible signal and a near-infrared signal) are obtained, no limitation is intended in this regard; for example, three or more types of different signals may be used by obtaining a far-infrared signal addition to the visible light signal and the near-infrared signal.

In step S1603, the noise amount calculation circuit 1503 calculates noise amounts of the input signals. For example, variance values of noise included in the input signals are calculated. In accordance with expression (7) and expression (8), noise variance $\sigma^2_{VIR(v,h,t)}$ of luminance components of the visible signal is obtained. Note that noise variance $\sigma^2_{IR(v,h,t)}$ of luminance components of the invisible signal can also be calculated using similar expressions.

$$\sigma^2_{VIR(v,h,t)} = \frac{1}{(2 \times s1 + 1)(2 \times s2 + 1)} \sum_{i=-s1}^{s1} \sum_{j=-s2}^{s2} (Y(v+i, h+j, t) - \overline{Y}(v, h, t))^2 \quad \text{Expression (7)}$$

$$\overline{Y}(v, h, t) = \frac{1}{(2 \times s1 + 1)(2 \times s2 + 1)} \sum_{i=-s1}^{s1} \sum_{j=-s2}^{s2} Y(v+i, h+j, t) \quad \text{Expression (8)}$$

In general, noise variance included in a target signal can be accurately calculated by setting large values as s1, s2. Note that a calculation method for a noise level is not limited to expressions (7), (8), and various calculation methods can be used, such as a calculation method using the standard deviation of noise or the noise property of the sensors.

In step S1604, similarly to the first embodiment, the change amount calculation circuit 1504 reads out an input signal obtained from the input signal obtaining circuit 1501 and an output signal of an immediately preceding frame that has the same wavelength range as the input signal from a non-illustrated frame memory, and calculates a change amount on a per-wavelength basis.

In step S1605, the cyclic coefficient determination circuit 1505 calculates a cyclic coefficient based on wavelength information input from the camera information obtaining circuit 1502, a noise amount input from the noise amount calculation circuit 1503, and an inter-frame change amount input from the change amount calculation circuit 1504. Below, the process of calculating a cyclic coefficient will be described in detail.

First, the wavelength information input from the camera information obtaining circuit 1502 and the noise amounts of different wavelengths input from the noise amount calculation circuit 1503 are obtained, and thresholds TH1, TH2, moving subject cyclic coefficients α1, and still subject cyclic coefficients α2 corresponding to the visible light signal and the near-infrared signal are calculated. As shown in expressions (9), (10), the moving subject cyclic coefficient, the still subject cyclic coefficient ($\alpha1_{VIR}$, $\alpha2_{VIR}$), and the threshold ($TH_{VIR}$) of the visible light signal are set to be larger than the moving subject cyclic coefficient, the still subject cyclic coefficient ($\alpha1_{IR}$, $\alpha2_{IR}$), and the threshold ($TH_{IR}$) of the near-infrared signal. Especially in the present embodiment, as shown in expression (9), the moving subject cyclic coefficient and the still subject cyclic coefficient ($\alpha1_{VIR}$, $\alpha2_{VIR}$), of the visible light signal are set to values larger than 0.5 in order to alleviate the influence of a moving subject in the visible light signal.

$$0.0 \leq \alpha1_{IR} < \alpha2_{IR} < 0.5 < \alpha1_{VIR} < \alpha2_{VIR} \leq 1.0 \qquad \text{Expression (9)}$$

$$0 \leq TH_{IR} < TH_{VIR} \leq 255 \qquad \text{Expression (10)}$$

As shown in expression (9), the cyclic coefficients can take a value in a range of 0 to 1, inclusive, and the thresholds of an inter-frame change amount are given in expression (10) assuming an absolute difference value (from 0 to 255, inclusive) of an 8-bit signal as an example.

Furthermore, in the second embodiment, the moving subject cyclic coefficients and the still subject cyclic coefficients of the visible light signal and the near-infrared signal are determined in consideration of the noise amounts input from the noise amount calculation circuit 1503 while the relationship of expression (9) is satisfied. For example, as shown in expressions (11) to (13), when there is a large difference between the noise amounts of the visible light signal and the near-infrared signal, the cyclic coefficient of the near-infrared signal is set to a large value (a value close to $\alpha1_{IR\_MAX}$).

$$a1_{IR} = \begin{cases} a1_{IR\_MIN} & (\text{if } \Delta\sigma^2_{IR-VIR}(v, h, t) < TH'1) \\ a1_{IR\_MIN} + \dfrac{(a1_{IR\_MAX} - a1_{IR\_MIN}) \times (\Delta\sigma^2_{IR-VIR}(v, h, t) - TH'1)}{TH'2 - TH'1} & (\text{if } TH'1 \leq \Delta\sigma^2_{IR-VIR}(v, h, t) \leq TH'2) \\ a1_{IR\_MAX} & (\text{if } TH'2 \leq \Delta\sigma^2_{IR-VIR}(v, h, t)) \end{cases} \qquad \text{Expression (11)}$$

$$0.5 < a1_{IR\_MIN} < a1_{IR\_MAX} \leq 1.0 \qquad \text{Expression (12)}$$

$$\Delta\sigma^2_{VIR-IR} = \sigma^2_{VIR(v,h,t)} - \sigma^2_{IR(v,h,t)} \qquad \text{Expression (13)}$$

Here, TH'1, TH'2, $\alpha1_{IR\_MIN}$, and $\alpha1_{IR\_MAX}$ in (11) are parameters that set an upper limit and a lower limit with respect to each signal. These parameters may be, but are not limited to, fixed values that have been determined in advance; for example, these parameters may be changed depending on various factors using a method that changes these parameters in accordance with the exposure settings of the camera and illuminance, a method in which a user dynamically changes these parameters, a method that changes these parameters depending on the temperatures of the sensors, and so on.

On the other hand, as shown in expressions (14), (15), when there is a large difference between the noise amounts of the visible light signal and the near-infrared signal, the cyclic coefficient of the visible light signal is set to a small value (a value close to $\alpha1_{VIR\_MAX}$).

$$a1_{VIR} = \begin{cases} a1_{VIR\_MAX} & (\text{if } \Delta\sigma^2_{IR-VIR}(v, h, t) < TH'3) \\ a1_{VIR\_MAX} - \dfrac{(a1_{VIR\_MAX} - a1_{VIR\_MIN}) \times (\Delta\sigma^2_{IR-VIR}(v, h, t) - TH'3)}{TH'4 - TH'3} & (\text{if } TH'3 \leq \Delta\sigma^2_{IR-VIR}(v, h, t) \leq TH'4) \\ a1_{VIR\_MIN} & (\text{if } TH'3 \leq \Delta\sigma^2_{IR-VIR}(v, h, t)) \end{cases} \qquad \text{Expression (14)}$$

$$0.0 < a1_{VIR\_MIN} < a1_{VIR\_MAX} \leq 0.5 \qquad \text{Expression (15)}$$

Here, TH'3, TH'4, $\alpha 1_{VIR\_MIN}$, and $\alpha 1_{VIR\_MAX}$ are parameters that set an upper limit and a lower limit with respect to each signal, similarly to expressions (11) and (12). The cyclic coefficient is calculated through the above-described processing. Determining the cyclic coefficient in accordance with a difference between the noise amounts of the visible light signal and the invisible light signal, as shown in expressions (11) to (15), makes it possible to perform cyclic NR processing that reduces a difference between the noise amounts of different wavelengths when such a difference has arisen.

Note that a calculation method for a cyclic coefficient that takes the noise amounts into consideration is not limited to the aforementioned method, and various calculation methods can be used, such as a method that performs calculation in accordance with a ratio between the noise amounts of the visible signal and the invisible signal, a method in which a noise amount that changes depending on the intensity of infrared illumination is set in a memory in advance and the noise amount is read out, and so on.

In step S1606, the composite processing circuit 1506 reads out an input signal obtained from the input signal obtaining circuit 1501 and an output signal of an immediately preceding frame that has the same wavelength range from the output signal hold circuit 1507, and composites them based on the value of the cyclic coefficient output from the cyclic coefficient determination circuit 1505. Thereafter, an output signal to which the cyclic NR processing has been applied is output.

In step S1607, the output signal hold circuit 1507 temporarily stores the output signal obtained in step S1606. In step S1608, the output signal conversion circuit 1508 sequentially obtains a plurality of output signals of different wavelength ranges, and converts them into appropriate signal components similarly to the first embodiment. The cyclic NR processing according to the present embodiment can be carried out by performing steps S1601 to S1608 described above with respect to all input signals.

The following describes the advantageous effects of a composite image that is obtained using a plurality of output signals of different wavelength ranges to which the cyclic NR processing of the present embodiment has been applied.

As shown in expressions (9), (10), the values of the cyclic coefficient and threshold of the visible light signal are set to be larger than those of the cyclic coefficient and threshold of the near-infrared light signal. Especially as shown in expression (9), the moving subject cyclic coefficient is set to a value larger than 0.5. Therefore, signal components of a moving subject are less likely to be maintained, and the visible light signal to which the cyclic NR processing has been applied can be treated as a background image that shows no moving subject. In this way, ghosting that occurs in a post-composition image can be alleviated.

Furthermore, determining the cyclic coefficient in accordance with a difference between the noise amounts of the visible light signal and the invisible light signal, as shown in expressions (11) to (15), makes it possible to alleviate a level difference in noise amount that occurs between the visible light signal and the invisible light signal with respect to a post-composition image.

Although the cyclic NR processing is applied intensely to the visible light signal for the purpose of suppressing post-composition ghosting and a level difference in noise according to the description of the present second embodiment, a configuration that applies the cyclic NR processing intensely to the invisible light signal is also possible.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-209194, filed Nov. 6, 2018, which is hereby incorporated by reference herein in its entirety.

What is claimed is:

1. An image processing apparatus comprising:
at least one processor; and
a memory that is coupled to the at least one processor and stores one or more computer-readable instructions, wherein the computer-readable instructions cause, when executed by the at least one processor, the at least one processor to function as:
an obtaining unit configured to sequentially obtain a plurality of image signals included in moving image data, the plurality of image signals being composed of image signals shot under different exposure periods;
a determination unit configured to determine a composition rate in order to composite an image signal that is included among the plurality of image signals obtained under a predetermined exposure period included among the different exposure periods with a noise-reduced image signal obtained under the predetermined exposure period that has already been generated;
a noise reduction unit configured to composite the image signal that has the predetermined exposure period with the noise-reduced image signal obtained under the predetermined exposure period that has already been generated using the composition rate, thereby generating a new noise-reduced image signal obtained under the predetermined exposure period; and a composition unit configured to composite the new noise-reduced image signal that has been generated with respect to the predetermined exposure period and an image signal obtained under another exposure period shorter than the predetermined exposure period, wherein the determination unit determines the composition rate in accordance with an inter-frame change amount of the image signal obtained under the predetermined exposure period and the predetermined exposure period so that the longer the exposure period, the higher an intensity of reduction of a signal that exhibits a change between image signals to be composited.

2. The image processing apparatus according to claim 1, wherein the predetermined exposure period is the longest exposure period among the different exposure periods.

3. The image processing apparatus according to claim 1, wherein the determination unit determines a composition rate for a signal in which the change amount is smaller than a first threshold in an image signal shot with a first exposure period, so that the composition rate reduces a signal that exhibits a change more intensely than a composition rate for a signal in which the change amount is larger than the first threshold in the image signal shot with the first exposure period.

4. The image processing apparatus according to claim 3, wherein the determination unit determines a composition rate for a signal in which the change amount is larger than a second threshold in an image signal shot with a second exposure period that represents an exposure period shorter than the first exposure period, so that the composition rate reduces a signal that exhibits a change more mildly than a composition rate for a signal in which the change amount is smaller than the second threshold in the image signal shot with the second exposure period.

5. The image processing apparatus according to claim 4, wherein the first threshold is larger than the second threshold.

6. The image processing apparatus according to claim 1, wherein the plurality of image signals compose consecutive frames of one set of moving images composing the moving image data.

7. The image processing apparatus according to claim 6, wherein the plurality of image signals are shot using the same image sensor.

8. An image processing apparatus comprising:

at least one processor; and a memory that is coupled to the at least one processor and stores one or more computer-readable instructions, wherein the computer-readable instructions cause, when executed by the at least one processor, the at least one processor to function as:

an obtaining unit configured to sequentially obtain a plurality of image signals included in moving image data, the plurality of image signals being composed of image signals shot under different wavelengths from visible light wavelengths to invisible light wavelengths including infrared wavelengths;

a determination unit configured to determine a composition rate in order to composite an image signal that is included among the plurality of image signals obtained under a predetermined wavelength included among the different wavelengths with a noise-reduced image signal obtained under the predetermined wavelength that has already been generated;

a noise reduction unit configured to composite the image signal obtained under the predetermined shooting condition with the noise-reduced image obtained under the predetermined wavelength that has already been generated using the composition rate, thereby generating a new noise-reduced image signal obtained under the predetermined wavelength; and a composition unit configured to composite the new noise-reduced image signal that has been generated with respect to the predetermined wavelength and an image signal obtained under another wavelength longer than the predetermined wavelength, wherein the determination unit determines the composition rate in accordance with an inter-frame change amount of the image signal obtained under the predetermined wavelength and the predetermined wavelength so that the shorter the wavelength, the higher an intensity of reduction of a signal that exhibits a change between image signals to be composited.

9. The image processing apparatus according to claim 8, wherein the determination unit determines a composition rate for a signal in which the change amount is smaller than a first threshold in an image signal shot at the visible light wavelengths, so that the composition rate reduces a signal that exhibits a change more intensely than a composition rate for a signal in which the change amount is larger than the first threshold in the image signal shot at the visible light wavelengths.

10. The image processing apparatus according to claim 9, wherein the determination unit determines a composition rate for a signal in which the change amount is larger than a second threshold in an image signal shot at the invisible light wavelengths, so that the composition rate reduces a signal that exhibits a change more mildly than a composition rate for a signal in which the change amount is smaller than the second threshold in the image signal shot at the invisible light wavelengths.

11. The image processing apparatus according to claim 8, wherein the determination unit determines the composition rate further in consideration of a difference between noise amounts of the image signals shot under the different wavelengths.

12. An image processing method comprising:

sequentially obtaining a plurality of image signals included in moving image data, wherein the plurality of image signals are composed of image signals shot under different exposure periods;

determining a composition rate in order to composite an image signal that is included among the plurality of image signals obtained under a predetermined exposure period included among the different exposure periods with a noise-reduced image signal obtained under the predetermined exposure period that has already been generated;

compositing the image signal that has the predetermined exposure period with the noise-reduced image signal obtained under the predetermined exposure period that has already been generated using the composition rate, thereby generating a new noise-reduced image signal obtained under the predetermined exposure period; and compositing the new noise-reduced image signal that has been generated with respect to the predetermined exposure period and an image signal obtained under another exposure period shorter than the predetermined exposure period, wherein the determining determines the composition rate in accordance with an inter-frame change amount of the image signal obtained under the predetermined exposure period and the predetermined exposure period so that the longer the exposure period, the higher an intensity of reduction of a signal that exhibits a change between image signals to be composited.

13. A non-transitory computer-readable storage medium storing a program for causing a computer to execute an image processing method comprising:

sequentially obtaining a plurality of image signals included in moving image data, wherein the plurality of image signals are composed of image signals shot under different exposure periods;

determining a composition rate in order to composite an image signal that is included among the plurality of image signals obtained under a predetermined exposure period included among the different exposure periods with a noise-reduced image signal obtained under the predetermined exposure period that has already been generated;

compositing the image signal that has the predetermined exposure period with the noise-reduced image signal obtained under the predetermined exposure period that has already been generated using the composition rate, thereby generating a new noise-reduced image signal obtained under the predetermined exposure period; and compositing the new noise-reduced image signal that has been generated with respect to the predetermined exposure period and an image signal obtained under another exposure period shorter than the predetermined exposure period, wherein the determining determines the composition rate in accordance with an inter-frame change amount of the image signal obtained under the predetermined exposure period and the predetermined exposure period so that the longer the exposure period, the higher an intensity of reduction of a signal that exhibits a change between image signals to be composited.

* * * * *